United States Patent
Panwar (10) Patent No.: US 8,533,579 B2
(45) Date of Patent: Sep. 10, 2013

(54) DATA LOSS DETECTION METHOD FOR HANDLING FUZZINESS IN SENSITIVE KEYWORDS

(75) Inventor: Vikas Panwar, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 524 days.

(21) Appl. No.: 12/603,465

(22) Filed: Oct. 21, 2009

(65) Prior Publication Data

US 2011/0093768 A1    Apr. 21, 2011

(51) Int. Cl.
*G06F 11/00*    (2006.01)

(52) U.S. Cl.
USPC .......................................................... 714/809

(58) Field of Classification Search
USPC .......................................................... 714/809
See application file for complete search history.

(56) References Cited

U.S. PATENT DOCUMENTS

| | | | |
|---|---|---|---|
| 6,944,344 B2* | 9/2005 | Imagawa et al. | 382/229 |
| 7,778,415 B2* | 8/2010 | Dyne | 380/44 |
| 8,073,255 B2* | 12/2011 | Nishikawa | 382/177 |
| 8,108,370 B1* | 1/2012 | Bruening | 707/697 |
| 2004/0255073 A1* | 12/2004 | Guy et al. | 711/1 |
| 2006/0020571 A1* | 1/2006 | Patterson | 707/1 |
| 2007/0208733 A1* | 9/2007 | Brault | 707/5 |
| 2007/0288451 A1* | 12/2007 | Meyer et al. | 707/5 |
| 2009/0254572 A1* | 10/2009 | Redlich et al. | 707/10 |
| 2009/0300770 A1* | 12/2009 | Rowney et al. | 726/26 |
| 2010/0010989 A1* | 1/2010 | Li et al. | 707/5 |
| 2010/0174728 A1* | 7/2010 | Ding | 707/758 |
| 2012/0209701 A1* | 8/2012 | Ferreira et al. | 705/14.49 |

OTHER PUBLICATIONS

Tian-Qing Zhu; Ping Xiong; , "Optimization of membership functions in anomaly detection based on fuzzy data mining," Machine Learning and Cybernetics, 2005. Proceedings of 2005 International Conference on , vol. 4, no., pp. 1987-1992 vol. 4, Aug. 18-21, 2005.*

* cited by examiner

*Primary Examiner* — John Trimmings
(74) *Attorney, Agent, or Firm* — Lowenstein Sandler LLP (57) ABSTRACT

A method and apparatus for handling fuzziness in sensitive keywords from data loss prevention (DLP) policies. In one embodiment, the method includes identifying a keyword included in a DLP policy, generating multiple permutations of the keyword, and adding the multiple permutations to the DLP policy. The method further includes causing information content to be searched for the keyword permutations to detect a violation of the DLP policy in the information content.

20 Claims, 6 Drawing Sheets

DATA LOSS DETECTION METHOD FOR HANDLING FUZZINESS IN SENSITIVE KEYWORDS

FIELD OF INVENTION

Embodiments of the invention relate to the field of processing data, and more particularly, to a data loss detection method for handling fuzziness in sensitive keywords.

BACKGROUND OF THE INVENTION

Data Loss Prevention (DLP) involves computer and information security, where DLP systems identify, monitor, and protect data in use (e.g., endpoint actions), data in motion (e.g., network actions), and data at rest (e.g., data storage). Such data may be in the form of files, messages, web requests or the like. Typically, a DLP system monitors various files, messages, etc. to determine whether they constitute use-restricted documents. A use-restricted document represents a document that cannot be freely distributed or manipulated due to its sensitive nature. Use-restricted documents may be marked with such words as "confidential," "sensitive," "stock," etc. to indicate their sensitive nature. In addition, use-restricted documents may include confidential information such as customer, employee or patient personal information, pricing data, design plans, source code, CAD drawings, financial reports, etc.

A DLP system may determine whether a file or a message is a use-restricted document by applying a DLP policy. A DLP policy may specify what data should be present in a file or message to be classified as a use-restricted document. For example, a DLP policy may specify one or more keywords (e.g., "confidential," "sensitive," "stock," names of specific diseases (e.g., "cancer," "HIV," etc.), etc.) for searching various files, messages and the like. However, rigid matches on keywords are limiting because they do not account for situations in which a user misspells a word in a document by mistake or intentionally to fool the DLP software. For example, "SENSITIEV" and "SENISTIVE" are both slight variations of the word "SENSITIVE." The meaning of these variations can still be understood by a human user but not by the DLP software configured to perform a conventional keyword matching.

SUMMARY OF THE INVENTION

A method for handling fuzziness in sensitive keywords from data loss prevention (DLP) policies is described. According to an exemplary method, a computer system identifies a keyword included in a DLP policy, generates multiple permutations of the keyword, adds the permutations to the DLP policy, and causes information content to be searched for the generated permutations of the keyword to detect a violation of the DLP policy. In some embodiments, each permutation of the keyword is a distinct anagram of the keyword.

In some embodiments, generating permutations of the keyword includes receiving user input specifying a maximum number of characters to be used to permute the keyword, and limiting the number of characters to be permuted to the specified maximum number of characters when generating the permutations of the keyword. In other embodiments, generating permutations of the keyword includes receiving user input specifying the number of last characters to be permuted, and permuting the specified number of last characters of the keyword when generating the permutations of the keyword.

In yet other embodiments, generating permutations of the keyword includes receiving both user input specifying a maximum number of characters to be used to permute the keyword and user input specifying the number of last characters to be permuted, and permuting the specified number of last characters of the keyword while limiting the number of characters to be permuted to the specified maximum number of characters.

In some embodiments, generating permutations of the keyword includes receiving user input specifying exceptions for keyword permutations, and removing exceptions from the permutations to be added to the DLP policy. In some embodiments, a user interface is provided to allow a user to specify one or more parameters for generating the permutations of the keyword. In some embodiments, the exemplary method further includes creating a record of the DLP policy violation, the record identifying the information content, a detected permutation and a corresponding keyword. In some embodiments, the information content being searched is data in use, data in motion, or data at rest.

In addition, a computer readable storage medium for handling fuzziness in sensitive keywords from data loss prevention (DLP) policies is described. An exemplary computer readable storage medium provides instructions, which when executed on a processing system cause the processing system to perform a method such as the exemplary method discussed above.

Further, a computer system for handling fuzziness in sensitive keywords from data loss prevention (DLP) policies is described. An exemplary computer system may include a memory to store a DLP policy, a processor coupled to the memory, and a policy management system, executed from the memory by the processor. The policy management system is operable to identify a keyword included in the DLP policy, generate permutations of the keyword, add the permutations to the DLP policy, and cause information content to be searched for the permutations of the keyword to detect a violation of the DLP policy in the information content.

In some embodiments, the exemplary computer system further includes a data management system, coupled to the policy management system, to detect the violation of the DLP policy, and to create a record of the DLP policy violation, where the record identifies the information content, a detected permutation and a corresponding keyword. In some embodiments, each permutation of the keyword is a distinct anagram of the keyword.

In some embodiments, the policy management system includes a user interface to receive user input specifying a maximum number of characters to be used to permute the keyword, and the policy management system limits the number of characters to be permuted to the specified maximum number of characters when generating the permutations of the keyword. Alternatively, or in addition, the user interface may receive user input specifying the number of last characters to be permuted, and the policy management system may permute the specified number of last characters of the keyword when generating the permutations of the keyword.

In some embodiments, the policy management system includes a user interface to receive user input specifying exceptions for keyword permutations, and the policy management system removes exceptions from the permutations to be added to the DLP policy.

BRIEF DESCRIPTION OF THE DRAWINGS

The present invention will be understood more fully from the detailed description given below and from the accompa

DETAILED DESCRIPTION OF THE PRESENT INVENTION

A method and apparatus for handling fuzziness in sensitive keywords from DLP policies is described. In one embodiment, a server hosts a policy management system that allows a user to define a data loss prevention (DLP) policy. The DLP policy may specify one or more keywords that should be used for searching information content (e.g., files, messages, etc.) to determine whether the information content includes confidential data. The policy management system creates multiple permutations (e.g., anagrams) of a keyword, and adds the multiple permutations to the DLP policy. During data monitoring, the information content is searched for the permutations of the keyword to detect a violation of the DLP policy. In one embodiment, if a match of a keyword permutation is found in the information content, a DLP policy violation is recorded, specifying the information content, the found permutation, the corresponding keyword, etc.

Embodiments of the present invention provide a data loss detection mechanism with improved keyword detection capabilities. Users' accidental mistakes as well as intentional stealing of data are addressed by detecting keywords even when they have a certain fuzziness associated with them.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1:
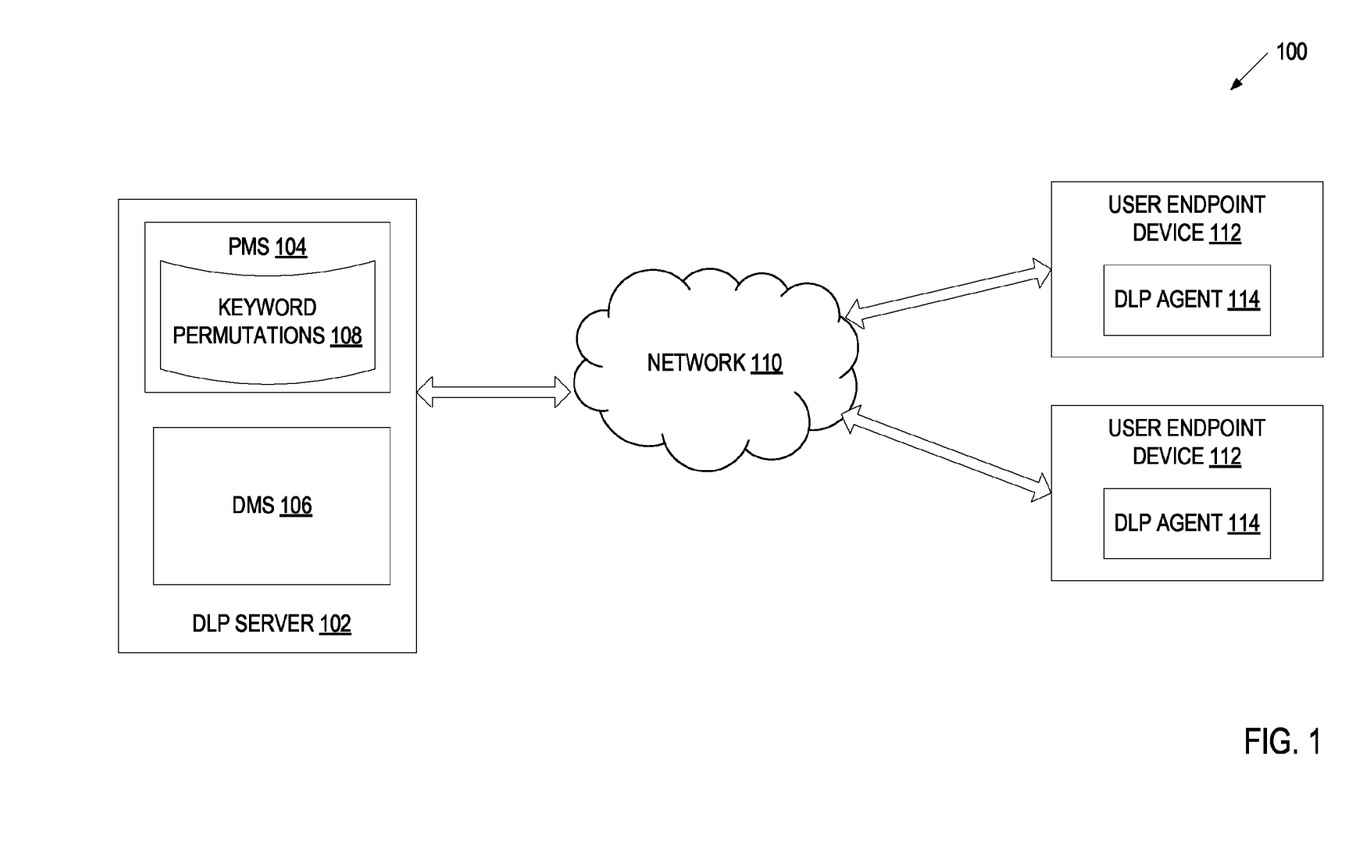
- FIG. 1 is a block diagram of exemplary network architecture in which embodiments of the invention may operate.

FIG. 1 is a block diagram of exemplary network architecture 100 in which embodiments of the invention may operate. The network architecture 100 may include a DLP server 102 and multiple user endpoint devices 112 coupled to the DLP server 102 via a network 110 (e.g., public network such as the Internet or private network such as a local area network (LAN)).

The DLP server 102 may represent one or more machines such as a server computer system, a router, gateway, etc. The DLP server 102 may be part of an organization's network and may receive and/or intercept information content (e.g., files, messages, web requests, etc.) incoming to, and outgoing from, the organization's network. The client devices 112 may include personal computers, laptops, PDAs, mobile phones, network appliances, etc. The client devices 112 may be operated by the employees of the organization or some other users.

The DLP server 112 protects confidential information maintained by the organization. Confidential information may be stored in a structured form such as a database, a spreadsheet, etc., and may include, for example, customer, employee, patient or pricing data. In addition, confidential information may include unstructured data such as design plans, source code, CAD drawings, financial reports, etc. The DLP server 112 may include a policy management system (PMS) 104 and a data monitoring system (DMS) 106 that may reside on the same machine or different machines coupled directly or via a network (e.g., LAN).

The PMS system 104 defines DLP policies that specify rules for monitoring content to detect presence of confidential information. For example, a DLP policy rule may specify one or more keywords (e.g., "confidential," "sensitive," "stock," names of specific diseases (e.g., "cancer," "HIV," etc.), etc.) for searching various files, messages and the like. A user can misspell a word in a file or a message by mistake or intentionally to fool the content monitoring mechanisms of system 100. For example, a user may type "SENSITIEV" or "SENISTIVE" instead of the word "SENSITIVE." The PMS 104 addresses the above issues by creating multiple permutations 108 of each keyword contained in a DLP policy and adding the keyword permutations to the DLP policy. The PMS 104 can create keyword permutations 108 automatically or upon a user request.

In addition to keywords, a DLP policy may include other rules for detecting presence of confidential data in information content being monitored. For example, in a financial organization, a DLP policy may specify that if a message contains the word "confidential," further search of the message should be performed to determine whether the message includes customer data (e.g., a social security number, first name, last name, etc.) or other sensitive information (e.g., financial reports, source code, etc.). A DLP policy may also specify what actions should be taken when a policy violation is detected. For example, a DLP policy may require that a message containing confidential data be blocked, re-routed, reported, etc.

DLP policies created by the PMS 104 are provided to the DMS 106 that performs content monitoring to detect policy violations. The content being monitored for presence of confidential information may include data in motion such as incoming and outgoing messages or web requests transported using various protocols (e.g., simple mail transfer protocol (SMTP), hypertext transfer protocol (HTTP), file transfer protocol (FTP), AOL Instant Messaging (AIM), ICQ, single object access protocol (SOAP), SQLNet, transmission control protocol/Internet protocol (TCP/IP), user datagram protocol (UDP), Ethernet, 802.11, etc.). In addition, the content being monitored may include data at rest such as data stored in centralized data repositories that may potentially contain documents with confidential information. When a DLP policy contains a keyword, the DMS 106 searches content for permutations of the keyword. As discussed above, keyword permutations could be created and added to a DLP policy by the PMS 104. Alternatively, the PMS 104 may not deal with keyword permutations, and instead the DMS 106 may create keyword permutations during content monitoring. If the DMS 106 finds a keyword permutation in the content being monitored, the DMS 106 may create a record identifying the content, the relevant DLP policy, a user associated with the violation, the found permutation and the corresponding keyword. In addition, the DMS 106 may take other actions required by the DLP policy.

In one embodiment, each user endpoint device 112 hosts a DLP agent 114 that receives DLP policies from the PMS 104 and uses the DLP policies to monitor local content (i.e., data in use) such as files, messages, web requests, etc. stored or used on user endpoint device 112. Similar to the DMS 106, if a DLP policy contains one or more keywords, DLP agent 114 searches the content being monitored for permutations of the keyword as discussed above with respect to the DMS 106.

When in addition to keywords, a DLP policy requires a search for the actual source data (e.g., customer, employee or patient personal information, pricing data, design plans, source code, CAD drawings, financial reports, etc.), the DMS 106 and/or the DLP agent 114 may not use the actual source data but rather fingerprints of the source data, to avoid exposing the confidential information and to facilitate more efficient searching of the content. Fingerprints may include hashes of source data, encrypted source data, or any other signatures uniquely identifying the source data. The DMS 106 and the DLP agent 114 may then report DLP policy violations and/or perform other necessary actions (e.g., blocking or rerouting the relevant content).

Figure 2:
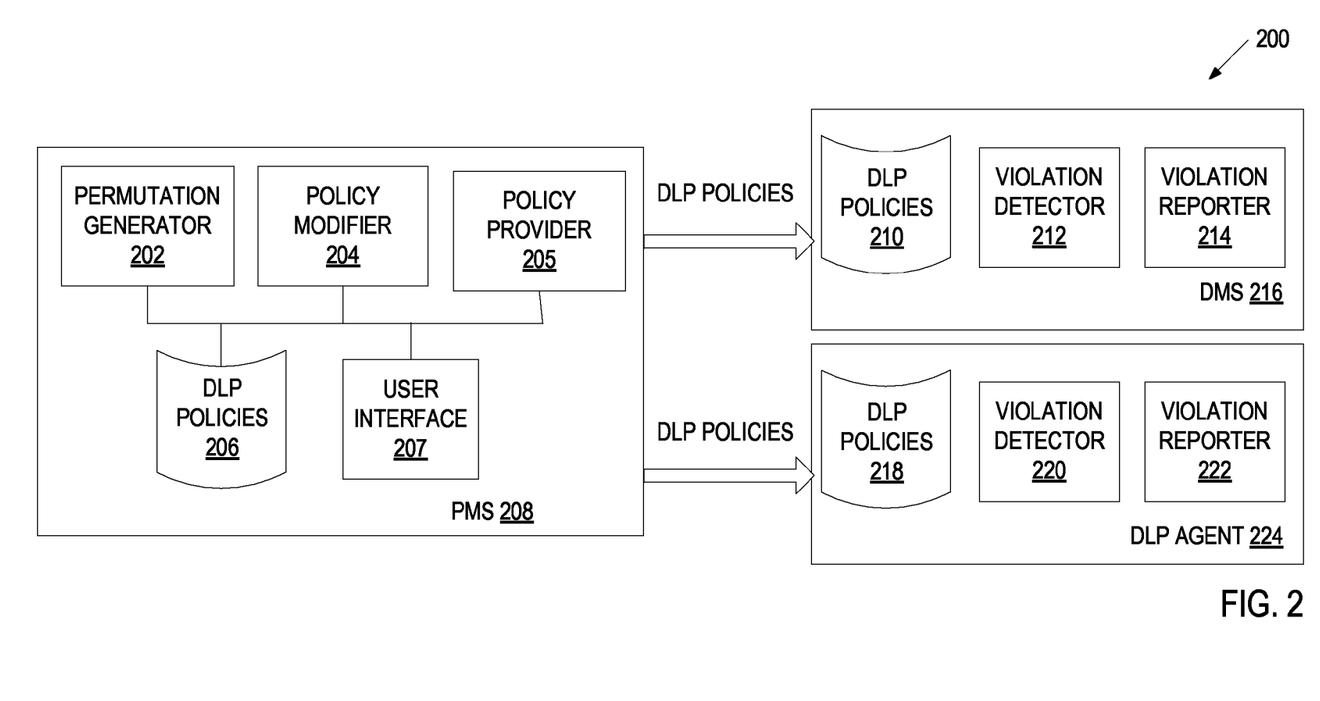
FIG. 2 is a block diagram of one embodiment of a data loss prevention (DLP) system.

FIG. 2 is a block diagram of one embodiment of a DLP system 200. The DLP system 200 may include a PMS 208, a DMS 216 and multiple DLP agents 224. PMS 208, DMS 216 and DLP agent 224 may reside on different machines and be coupled to each other via network (e.g., a public network such as Internet or a private network such as LAN). Alternatively, PMS 208 and DMS 216 may reside on the same machine and be coupled to each DLP agent via a network.

The PMS 208 is responsible for defining DLP policies, and transferring them to the DMS 216 and the DLP agents 224. In one embodiment, the PMS 208 includes a permutation generator 202, a policy modifier 204, a policy provider 205, a user interface 207, and a data store 206. The data store 206 may reside on one or more mass storage devices, such as magnetic or optical storage based disks, tapes or hard drives.

The permutation generator 202 identifies keywords in a DLP policy. Keywords may be included in a DLP policy automatically or specified by a user. For each keyword, the permutation generator 202 generates various permutations of a keyword. Each permutation may be a distinct anagram of a keyword with a different sequence of keyword characters. The permutation generator 202 may create keyword permutations automatically upon identifying a keyword in a DLP policy, or in response to a user request. In one embodiment, the user interface 207 is provided to allow a user to submit a permutation generation request. The user interface 207 may also allow a user to limit the number of permutations and/or provide exceptions that should be excluded from the permutations of the keyword. An exemplary user interface will be discussed in more detail below in conjunction with FIG. 3.

The policy modifier 204 updates the DLP policy using the keyword permutations created by the permutation generator 202, and stores the updated DLP policy in the data store 206. The policy provider 205 provides the DLP policies residing in the data store 206 to the DMS 216 and/or the DLP agent(s) 224 to cause detection of DLP policy violations.

The DMS 216 includes a violation detector 212, a violation reporter 214, and a data store 210. The data store 210 resides on one or more mass storage devices, such as magnetic or optical storage based disks, tapes or hard drives. The data store 210 stores DLP policies provided by the PMS 208. The violation detector 212 monitors content such as data in motion and data at rest using DLP policies 210. If a DLP policy requires a search of content for a keyword, the violation detector 212 searches the content for the keyword permutations. If the content does not include any of the keyword permutations, the violation detector 212 ignores the content. If the violation detector 212 finds a matching keyword or a matching keyword permutation, and the DLP policy does not include any other search rules, the violation detector 212 invokes the violation reporter 214 to record a DLP policy violation. The violation reporter 214 then creates a record identifying the content in which a match is detected, the relevant DLP policy, a user associated with the violation, the found keyword permutation and the corresponding keyword. The violation reporter 214 may also perform other actions with respect to the content in which a policy violation was detected. For example, the violation reporter 214 may add the violation record to a report and send the report to an appropriate entity (e.g., a system administrator, a supervisor of a user associated with the violation, etc.), or it may prevent the content from being accessible or sent to a specific user.

If the violation detector 212 finds a match of a keyword or a keyword permutation in the content, and the DLP policy includes other search rules such as rules requiring matching of the content against fingerprints of confidential data, the violation detector 212 continues the search of the content using the relevant fingerprints. Depending on the search results, the violation detector 212 may determine that the content violates the DLP policy and may invoke the violation reporter 214 to perform any of the actions discussed above.

The DLP agent 224 includes a violation detector 220, a violation reporter 222, and a data store 218. The data store 218 resides on one or more mass storage devices, such as magnetic or optical storage based disks, tapes or hard drives. The data store 218 stores DLP policies provided by the PMS 208. The violation detector 220 monitors local content (i.e., data in use) using DLP policies 218, similarly to the violation detector 212. The violation reporter 222 reports detected policy violations and/or performs other actions, similarly to the violation reporter 222.

In an alternative embodiment (not shown), keyword permutations are not created by the PMS 208. Rather, if a DLP policy includes a keyword, the violation detector 212 or 220 may search information content for the keyword, and if the information content does not contain a match, the violation detector 212 or 220 may create permutations of the keyword and then search for the permutations of the keyword. Permutation creation operations may be configurable by a user (e.g., a system administrator). For example, the user may specify that the number of permutations to be created should be limited by a specific number of keyword characters, or provide some other input with respect to permutation creation.

The components of FIG. 2 may represent modules that can be combined together or separated into further modules, according to some embodiments.

Figure 3:
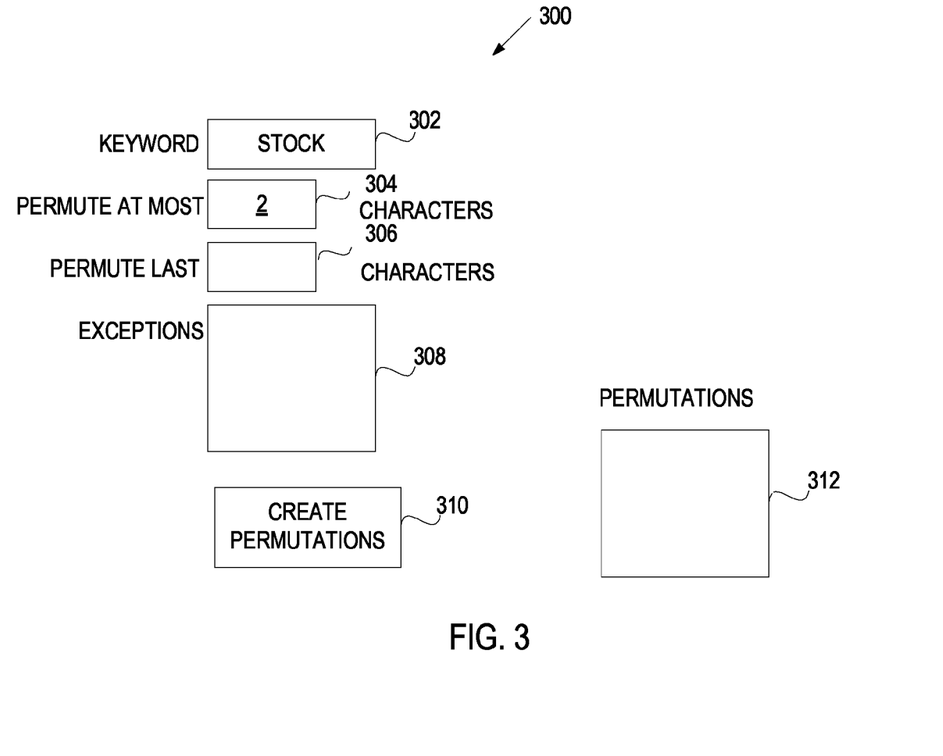
FIG. 3 illustrates an exemplary keyword permutation GUI provided by a policy management system (PMS) in accordance with some embodiments of the invention.

FIG. 3 illustrates an exemplary graphical user interface (GUI) 300 provided by PMS 208 to facilitate use input with respect to keyword permutations, in accordance with some embodiments of the invention. GUI 300 may be part of a DLP policy GUI or it may be an independent GUI that can be invoked via a designated link.

GUI 300 includes a keyword field 302 that can be either pre-populated with a keyword that is part of the DLP policy or require a user to enter a desired keyword. Button 310 allows a user to request that permutations such as anagrams be created for keyword 302.

The total number of anagrams of a keyword is "n!" (factorial of n) where "n" is the number of characters in the keyword. For example, keyword "sensitive" that includes 9 characters will have 362,880 anagrams. Fields 304, 306 and 308 allow a user to enter parameters that limit the number of permutations created for a keyword. In particular, field 304 allows a user to specify a maximum number of keyword letters that can be permuted, with a default number of 2. For the default number, the number of permutations of a keyword can be expressed as $\Sigma(k)+1$, where "k" goes from 1 to (n−1) and "n" is equal to the number of characters in the keyword. For example, if the user requests that at most 2 characters be permuted in keyword "sensitive," then the resulting number of permutations will be limited to 37.

Field 306 allows a user to specify the number of last characters that should be permuted in a keyword. For example, the user may request that only the last 6 characters of keyword "sensitive" be permuted, which will result in "6!" permutations, i.e., 720 anagrams. The user may specify both field 304 and field 306 or either of the two fields.

In addition, the user may specify exceptions 308 that should not be included in the list of permutations for a keyword. For example, the user may request via button 310 that permutations be created for keyword 302. In response, GUI 300 will display a list of permutations in field 312. The user may then select certain permutations in the list 312 and add them to the exception list 308, which will result in removal of these permutations from the list 312. A permutation may be added to the list of exceptions if, for example, a user knows that this permutation is a valid word or name that should not trigger a policy violation.

It should be noted that GUI 300 is provided for illustrative purposes only; a variety of other GUIs can be used to configure parameters of a permutation generation algorithm without loss of generality.

Figure 4:
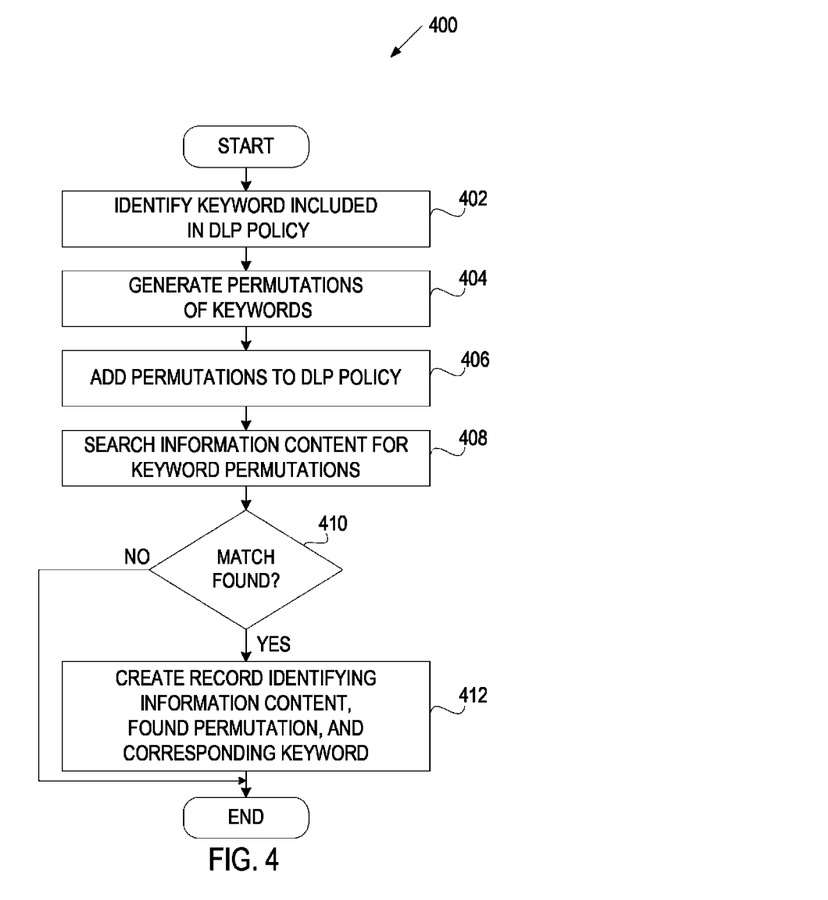
FIG. 4 is a flow diagram of one embodiment of a data loss detection method for handling fuzziness of sensitive keywords.

FIG. 4 is a flow diagram of one embodiment of a data loss detection method 400 for handling fuzziness in sensitive keywords. The method 400 is performed by processing logic that may comprise hardware (circuitry, dedicated logic, etc.), software (such as is run on a general purpose computer system or a dedicated machine), or a combination of both. In one embodiment, the method 400 is performed by a DLP system (e.g., DLP system 200 of FIG. 2).

Referring to FIG. 4, processing logic (e.g., of permutation generator 202 of PMS 208) begins with identifying a keyword included in a DLP policy (block 402). At block 404, processing logic (e.g., of permutation generator 202) generates permutations of the keyword. One embodiment of a method for generating permutations of a keyword will be discussed in more detail below in conjunction with FIG. 5.

At block 406, processing logic (e.g., of policy modifier 204 of PMS 208) adds the keyword permutations to the DLP policy. Processing logic (e.g., of policy provider 205 of PMS 208) may then provide the resulting DLP policy to a DMS of the DLP server and/or a DLP agent(s) hosted by a client(s) to cause detection of DLP policy violations.

Subsequently, at the DMS or the DLP agent, processing logic (e.g., of violation detector 212, 220) searches information content (e.g., a message, a file, a web request, etc.) for the keyword permutations (block 408). If a match is found (block 410), processing logic (e.g., of violation reporter 214, 222) creates a policy violation record identifying the information content, the DLP policy, a user associated with the policy violation, the found permutation of the keyword, and the keyword (block 412). If a match is not found, method 400 ends.

In one embodiment, processing logic first searches for the keyword, then searches for each permutation of the keyword, and then records all found matches. In another embodiment, processing logic only searches for a keyword permutation if a keyword match is not found. In addition, processing logic may search for one keyword permutation at a time and may stop searching once the first match is found.

Figure 5:
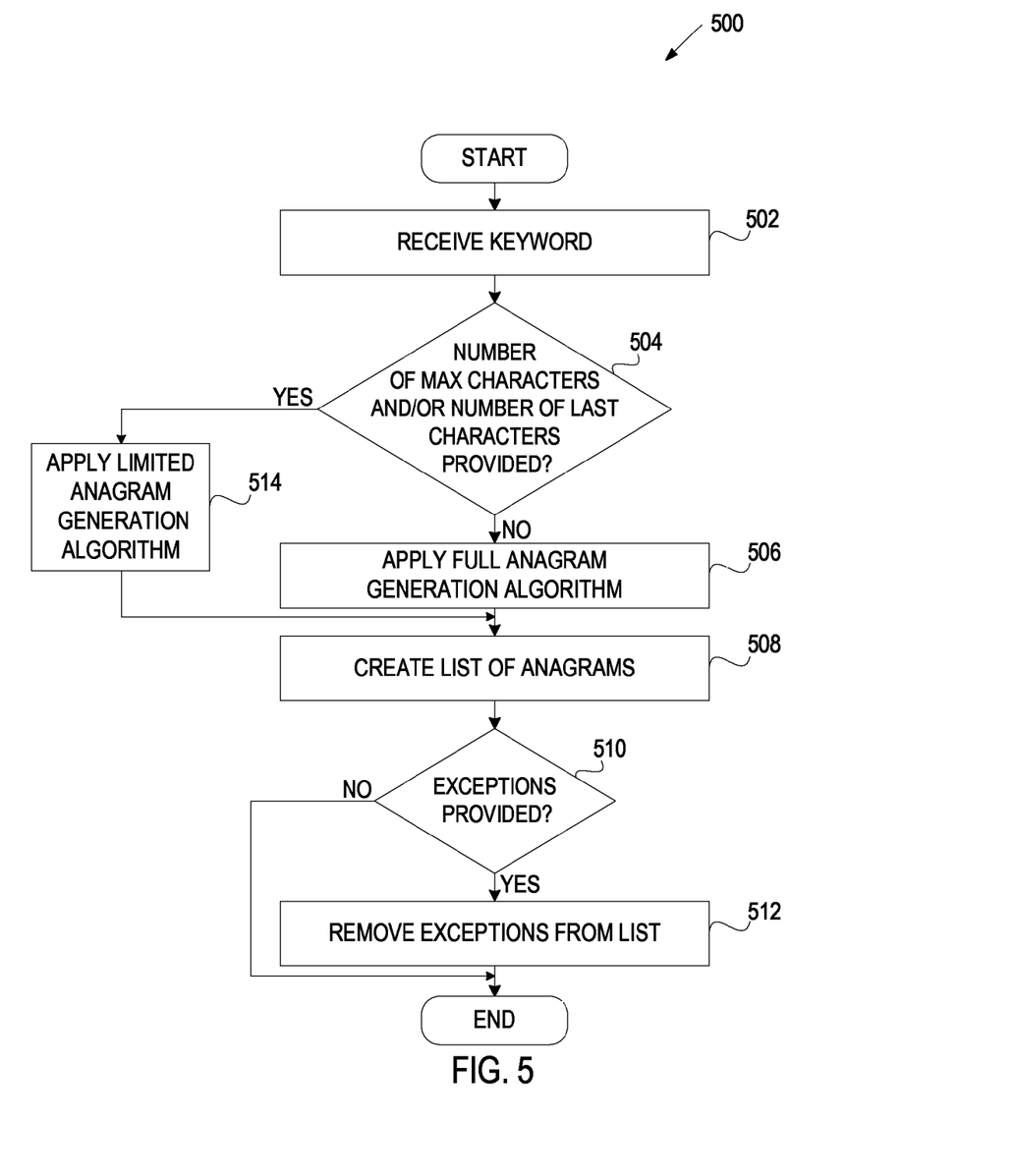
FIG. 5 is a flow diagram of one embodiment of a method for generating permutations if a keyword from a DLP policy.

FIG. 5 is a flow diagram of one embodiment of a method 500 for generating permutations of keyword from a DLP policy. The method 500 is performed by processing logic that may comprise hardware (circuitry, dedicated logic, etc.), software (such as is run on a general purpose computer system or a dedicated machine), or a combination of both. In one embodiment, the method 500 is performed by a PMS (e.g., PMS 104 of FIG. 1).

Referring to FIG. 5, processing logic begins with receiving a keyword (block 502). At block 504, processing logic determines whether the number of maximum characters to be permuted and/or the number of last characters to be permuted is provided. If not, processing logic applies a full anagram generation algorithm to the keyword. In one embodiment, the anagram generation algorithm is a recursive algorithm that can be expressed as follows:

```
let the input keyword string be <input>
let <permutation> be an empty string
call the following subroutine -
permute(<input>)
{
        for each letter L in <input>
        {
                append L to <permutation>
                let <newinput> be a copy of <input>
                remove letter L from <newinput>
                if (#letters in <newinput> > 0)
                        call permute(<newinput>)
                else
                {
                        print <permutation>
                        remove letter L from <permutation>
                }
        }
        if (#letters in <permutation> > 0)
                remove the last letter from <permutation>
}
```

If processing logic determines that the number of maximum characters M to be permuted and/or the number of last characters C to be permuted is provided, processing logic applies a limited anagram generation algorithm that permutes at most M characters and/or permutes the last C characters of the keyword (block 514).

At block 508, processing logic creates a list of anagrams of the keyword. At block 510, processing logic determines whether any exceptions are provided. If not, method 500 ends. If so, processing logic removes the exceptions from the list (block 512), and then method 500 ends.

Figure 6:
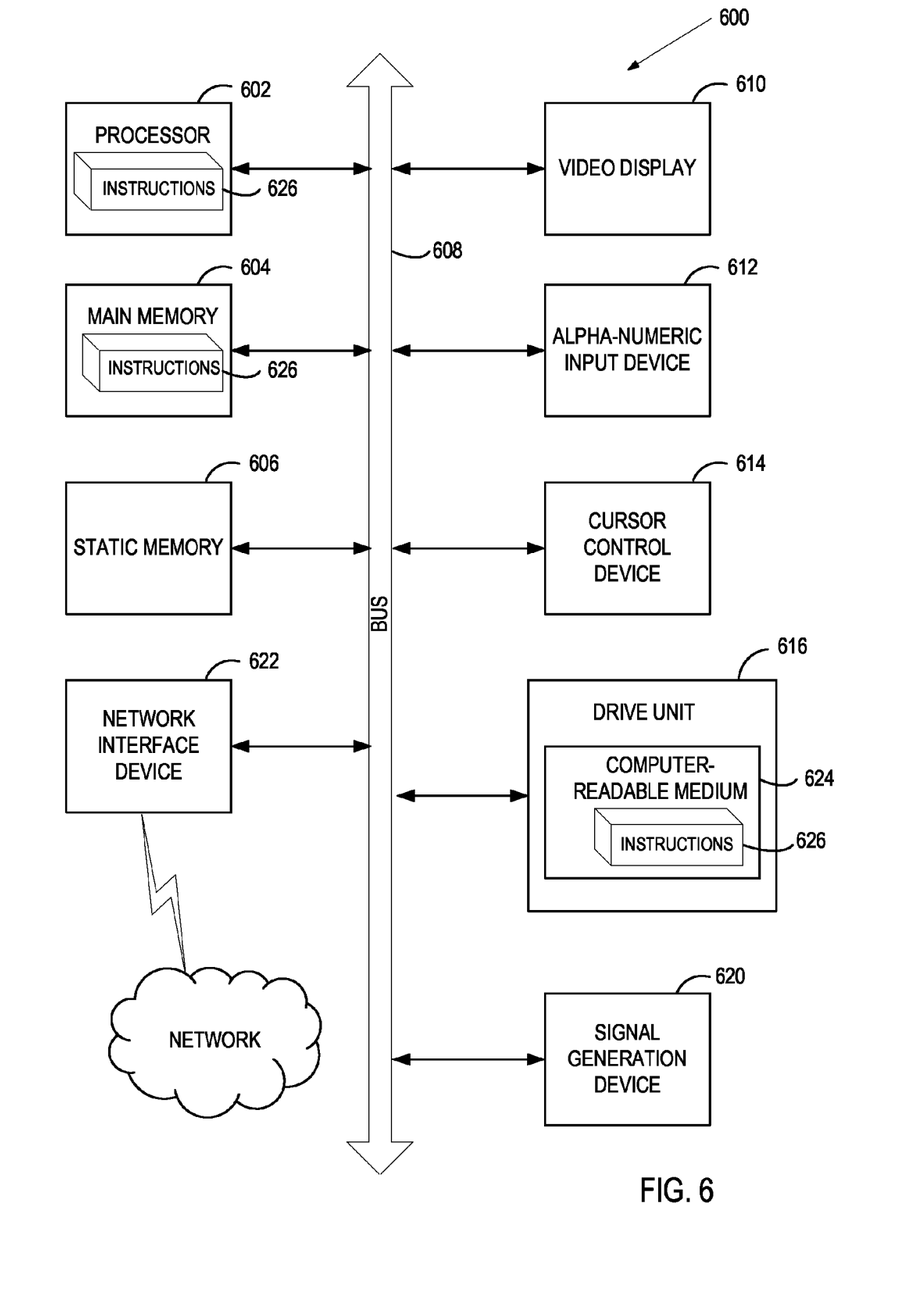
FIG. 6 illustrates a diagrammatic representation of a machine in the exemplary form of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a data storage device 618, which communicate with each other via a bus 606.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute the processing logic 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions (e.g., software 626) embodying any one or more of the methodologies or functions described herein. The software 626 may also reside, completely or at least partially, within the main memory 604 and/or within the processor 602 during execution thereof by the computer system 600, the main memory 604 and the processor 602 also constituting computer-readable media. The software 626 may further be transmitted or received over a network 620 via the network interface device 622.

While the machine-accessible storage medium 624 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

I claim:
1. A computer-implemented method comprising:
    identifying, by a computer system, a keyword included in a data loss prevention (DLP) policy, the keyword comprising a plurality of characters;
    generating, by the computer system and in response to the identifying, a plurality of permutations of the characters of the keyword, wherein up to a specified maximum number of permutable characters in the keyword are permuted to generate the plurality of permutations;
    adding, by the computer system, the plurality of permutations to the DLP policy; and
    causing information content to be searched for the keyword and the plurality of permutations to detect a violation of the DLP policy in the information content.

2. The method of claim 1 further comprising:
creating a record of the DLP policy violation, the record identifying the information content, a detected permutation and a corresponding keyword.

3. The method of claim 1, wherein each of the plurality of permutations is a distinct anagram of the keyword.

4. The method of claim 1, further comprising:
receiving user input specifying the maximum number of permutable characters to be used to permute the keyword.

5. The method of claim 1, wherein the maximum number of permutable characters comprises a maximum number of last characters of the keyword to be permuted.

6. The method of claim 1, wherein generating, by the computer system and in response to the identifying, a plurality of permutations comprises:
receiving user input specifying the maximum number of permutable characters to be used to permute the keyword and user input specifying a number of last characters to be permuted; and
permuting the specified number of last characters of the keyword while limiting the number of characters to be permuted to the specified maximum number of permutable characters, when generating the plurality of permutations.

7. The method of claim 1, wherein generating, by the computer system and in response to the identifying, a plurality of permutations comprises:
receiving user input specifying exceptions for keyword permutations; and
removing exceptions from the plurality of permutations prior to adding the plurality of permutations to the DLP policy.

8. The method of claim 1 further comprising:
providing a user interface allowing a user to specify one or more parameters for generating the plurality of permutations.

9. The method of claim 1 wherein the information content is any one of data in use, data in motion, and data at rest.

10. A computer system comprising:
a memory to store a data loss prevention (DLP) policy;
a processor, coupled to the memory; and
a policy management system, executed from the memory by the processor, to:
identify a keyword included in the DLP policy, the keyword comprising a plurality of characters;
generate, in response to identifying the keyword, a plurality of permutations of the characters of the keyword, wherein up to a specified maximum number of permutable characters in the keyword are permuted to generate the plurality of permutations;
add the plurality of permutations to the DLP policy; and
cause information content to be searched for the keywords and the plurality of permutations to detect a violation of the DLP policy in the information content.

11. The system of claim 10 further comprising:
a data management system, coupled to the policy management system, to detect the violation of the DLP policy, and to create a record of the DLP policy violation, the record identifying the information content, a detected permutation and a corresponding keyword.

12. The system of claim 10, wherein each of the plurality of permutations is a distinct anagram of the keyword.

13. The system of claim 10, wherein the policy management system comprises a user interface to receive user input specifying the maximum number of permutable characters to be used to permute the keyword.

14. The system of claim 10, wherein the maximum number of permutable characters comprises a maximum number of last characters of the keyword to be permuted.

15. The system of claim 10, wherein the policy management system comprises a user interface to receive user input specifying the maximum number of permutable characters to be used to permute the keyword and user input specifying a number of last characters to be permuted, wherein the policy management system is to permute the specified number of last characters of the keyword while limiting the number of characters to be permuted to the specified maximum number of permutable characters, when generating the plurality of permutations.

16. The system of claim 10, wherein the policy management system comprises a user interface to receive user input specifying exceptions for keyword permutations, wherein the policy management system is to remove exceptions from the plurality of permutations prior to adding the plurality of permutations to the DLP policy.

17. A non-transitory computer readable storage medium that provides instructions, which when executed on a processing system cause the processing system to perform a method comprising:
identifying, by a computer system, a keyword included in a data loss prevention (DLP) policy, the keyword comprising a plurality of characters;
generating, by the computer system and in response to the identifying, a plurality of permutations of the characters of the keyword, wherein up to a specified maximum number of permutable characters in the keyword are permuted to generate the plurality of permutations;
adding, by the computer system, the plurality of permutations to the DLP policy; and
causing information content to be searched for the keyword and the plurality of permutations to detect a violation of the DLP policy in the information content.

18. The non-transitory computer readable storage medium of claim 17, further comprising:
receiving user input specifying the maximum number of permutable characters to be used to permute the keyword.

19. The non-transitory computer readable storage medium of claim 17, wherein the maximum number of permutable characters comprises a maximum number of last characters of the keyword to be permuted.

20. The non-transitory computer readable storage medium of claim 17, wherein generating, by the computer system and in response to the identifying, a plurality of permutations comprises:
receiving user input specifying exceptions for keyword permutations; and
removing exceptions from the plurality of permutations prior to adding the plurality of permutations to the DLP policy.

* * * * *